Figure 1:
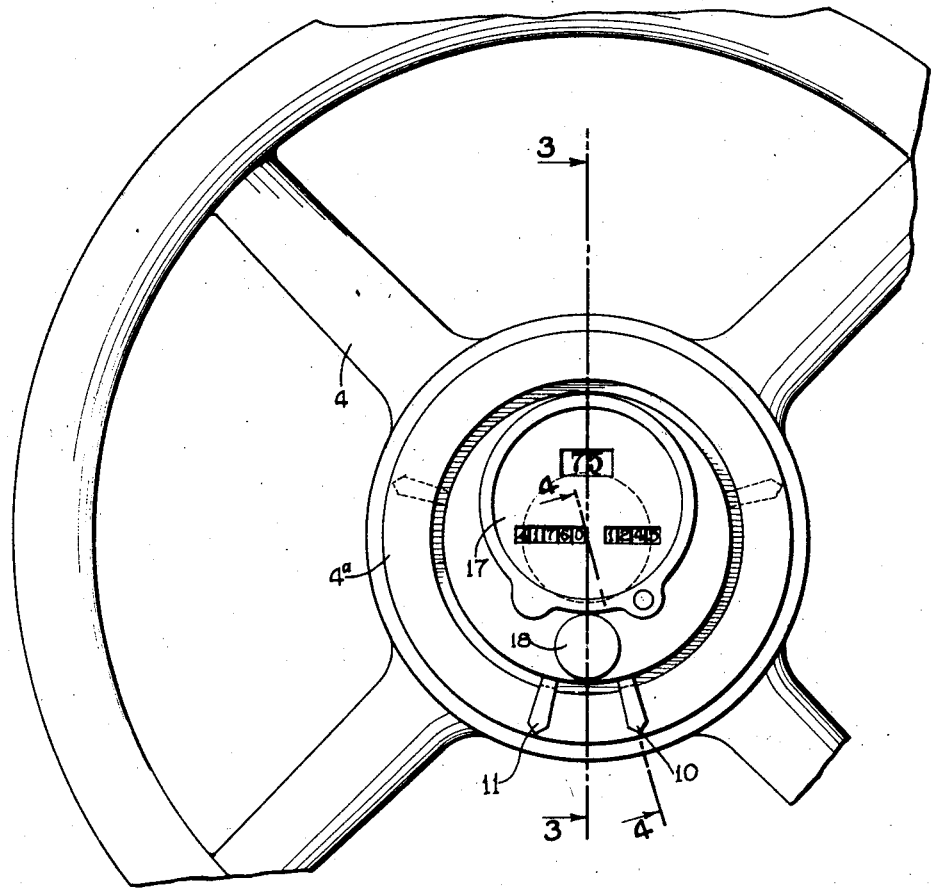

Nov. 20, 1928.

W. H. WHEELER 1,692,601

SPEEDOMETER MOUNTING FOR VEHICLES

Filed Sept. 20, 1926    2 Sheets-Sheet 1

INVENTOR.
WILLIAM H. WHEELER
BY A.B.Bowman
ATTORNEY

Nov. 20, 1928.

W. H. WHEELER 1,692,601

SPEEDOMETER MOUNTING FOR VEHICLES

Filed Sept. 20, 1926    2 Sheets-Sheet 2

INVENTOR.
WILLIAM H. WHEELER
BY A. B. Bowman
ATTORNEY

Patented Nov. 20, 1928.

1,692,601

UNITED STATES PATENT OFFICE.

WILLIAM H. WHEELER, OF SAN DIEGO, CALIFORNIA.

SPEEDOMETER MOUNTING FOR VEHICLES.

Application filed September 20, 1926. Serial No. 136,505.

My invention relates to speedometer mountings for vehicles, and the objects of my invention are; first, to provide a steering control means for vehicles on which is mounted a speedometer whereby the speed of the vehicle may be readily determined by merely dropping the vision slightly to the middle portion of the steering wheel which is substantially in line with the line of vision of the driver and as close to the eyes of the driver as possible, thus determining the speed of the vehicle with least danger to the driver and other occupants; second, to provide a steering post and steering wheel for automobiles which are so constructed that a speedometer may be mounted on the steering post at the middle portion of the steering wheel and substantially flush with the hub portion of the steering wheel, thus rigidly mounting the speedometer in plain view of the driver and in such a manner as not to interfere with the vision and necessary movements of the driver; third, to provide a steering post and steering wheel for automobiles which are so constructed as to receive and support a speedometer at the upper end of the steering post and at the middle portion of the steering wheel and to one side of the axis of the wheel so as to provide a convenient space for a signal button or other switch mechanism at the opposite side of the axis of the wheel and on the stationary portion at the middle portion thereof; fourth, to provide as a whole a novelly constructed and arranged mounting for a speedometer in connection with the steering post and steering wheel of an automobile; fifth, to provide a rigid drive shaft means for a speedometer mounted on the steering post, which drive shaft means extends through the steering post, thus materially decreasing the length of the flexible cable usually employed in connecting a revolving part of the automobile with the speedometer; and, sixth, to provide a speedometer mounting, in connection with the steering post and steering wheel of an automobile, which is simple and economical of construction, durable and which will not readily deteriorate or get out of order.

Figure 2:
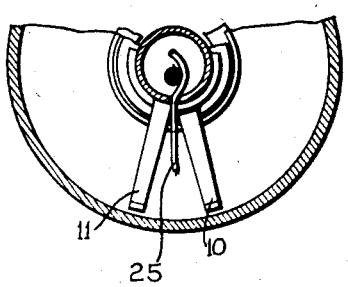
Figure 3:
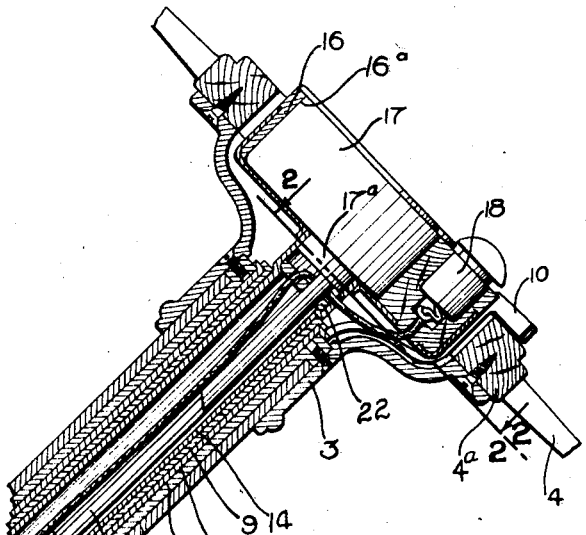
Figure 4:
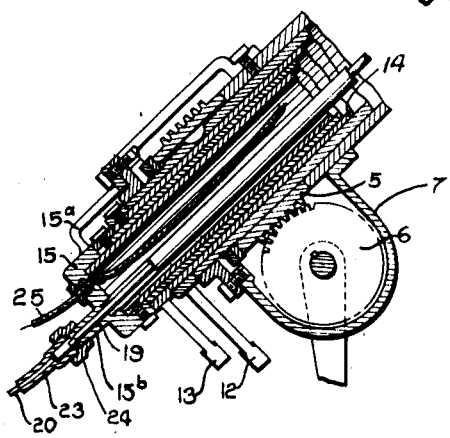
Figure 4:
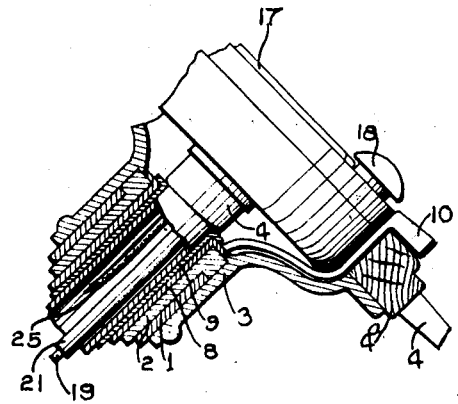

With these and other objects in view, as will appear hereinafter, my invention consists of certain novel features of construction, combination and arrangement of parts and portions as will be hereinafter described in detail, and particularly set forth in the appended claims, reference being had to the accompanying drawings and to the characters of reference thereon which form a part of this application, in which:

Figure 1 is a fragmentary view of an automobile steering wheel taken from the driver's side thereof, showing the speedometer mounted at the middle portion of the steering wheel; Fig. 2 is a fragmentary sectional view taken through 2—2 of Fig. 3, showing the construction of the upper end of the steering post below the steering wheel; Fig. 3 is a fragmentary longitudinal sectional view taken through 3—3 of Fig. 1, showing the construction and arrangement of the steering post, steering wheel and associated members and showing the speedometer mounted at the upper end of the steering post; and, Fig. 4 is a fragmentary sectional view thereof taken through 4—4 of Fig. 1.

Like characters of reference refer to similar parts and portions throughout the several views of the drawings.

In the steering post construction of certain types of conventional automobiles, the steering shaft or tube and also the ignition and fuel controls, as well as certain electric cables, extend through or are directly associated with a stationary hollow post. Such a construction and arrangement is illustrated in the drawings and will be briefly described hereafter.

The steering post 1 is rigidly mounted on the automobile frame in any suitable manner. Within the post 1, which is in the form of a tube, is rotatably mounted the steering tube 2 to the upper end of which is secured the metallic hub member 3 of the steering wheel, the lower end of the hub member 3 extending around the upper end of the steering post 1. To the upper or outer side of the hub member 3, is secured the annular portion 4ª of the steering wheel 4. To the opposite end of the steering tube 2, is secured a worm which is adapted to drive the steering worm gear 6 mounted in a casing 7. The casing 7 is secured to the lower end of the steering post 1 and rotatably supports the lower end of the steering tube. Within the tube 2 is rotatably mounted the fuel control tube 8 and within the latter is rotatably mounted the ignition control tube 9. Said tubes are provided at their upper ends with control levers 10 and 11 respectively which extend preferably beyond the upper side of the annular portion or hub portion of the steering wheel. To the lower ends of the tubes 8 and 9, are secured the fuel and ignition operating levers 12 and 13. Within the ignition tube 9, is nonrotatably mounted the tube 14 which usually extends beyond the upper and lower ends of the tubes 8 and 9 and is fixedly secured at its lower end, in any suitable manner, to the gear casing 7 or the steering post 1. The means shown in the drawings consists of a cap for the lower end of the tube 14, which cap is provided with arms 15ª secured to the gear casing 7. At the upper end of the stationary tube 14 is usually provided a stationary support in which is mounted a signal button or other switch means, the electric cable, connecting the same to the mechanism to be controlled, extending through the tube 14.

In my construction I have provided a relatively large and deep supporting member 16 which is positioned within the annular portion 4ª of the steering wheel and an inwardly offset recess in the hub member 3, and is secured at its under or inner side to the end of the stationary inner tube 14, extending beyond the fuel and ignition tubes. The large supporting member 16 is spaced at its peripheral portion from the annular portion 4ª of the steering wheel and also from the hub member 3 so as to provide sufficient space for the fuel and ignition levers 10 and 11, connected to the upper ends of the tubes 8 and 9 respectively and extending beyond and over the front side of the annular portion of the steering wheel, to be shifted and operated freely. The outer side of the supporting member 16 may be flush with or extended slightly beyond the outer face of the annular portion of the steering wheel, as shown.

In the outer side of the supporting member 16, is provided a deep recess 16ª in which is mounted the speedometer 17, the connecting boss 17ª of which extends preferably into the upper end of the stationary tube 14. The center or axis of the recess 16ª is preferably positioned eccentrically relative to the axis of the supporting member 16 and the steering wheel 4. Thus a space is provided at the opposite side of the axis of the stationary supporting member 16, between the speedometer 17 and the lower side of the member 16, for a signal button 18 or other switch mechanism or means.

The speedometer 17 is operated by a small rigid shaft 19 which connects the speedometer at the back side thereof with a flexible cable 20 usually employed in connecting a moving part of the automobile with the speedometer. The shaft 19 is revolubly mounted in a casing or tube 21 which is secured at its lower or forward end in the head portion of the cap 15 and is positioned at its upper end by a head member 22 positioned at the upper end of the stationary tube 14. The flexible tube 23 in which the flexible shaft 20 is mounted, is connected with an extended boss 15ᵇ of the cap 15 by means of a nut 24. Thus the length of the usual flexible cable is considerably reduced.

The electric cable 25 for the signal button 18 extends, preferably, backwardly through the supporting member 16 into the upper end of the stationary tube 14, through the head member 22, through the tube 14 alongside the speedometer shaft tube and out through the head of the cap 15.

The arms or levers 10 and 11, for controlling the fuel and ignition, are preferably positioned at the opposite sides of the electric cable 25, as shown best in Fig. 2, so as not to interfere with the same.

Though I have shown and described a particular construction, combination and arrangement of mounting a speedometer and also a signal button in connection with the steering post and steering wheel of an automobile, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a speedometer mounting for vehicles, the combination with a steering post and a steering wheel mounted thereon, of a supporting tube extending through said post and non-rotatably fixed relative thereto, said tube having an enlarged supporting portion at the end contiguous to said wheel, said supporting portion being spaced from said wheel, a speedometer mounted on said supporting portion, a small rigid shaft revolubly mounted within said tube and operatively connected at one end to the back side of said speedometer, and a flexible cable directly connecting the end of said shaft extending beyond said tube to a revolving part of the vehicle.

2. In a speedometer mounting for vehicles, the combination with a steering post and a steering wheel mounted thereon and provided with a hollow hub, of a supporting tube extending through said post and non-rotatably fixed relative thereto, said tube having an enlarged supporting portion at the end contiguous to said hub, said supporting portion being positioned within and spaced from said hub, and a speedometer mounted in the supporting portion of said tube substantially flush with the front side of the hub of the steering wheel.

3. In a speedometer mounting for vehicles, the combination with a steering post and a steering wheel mounted thereon and provided with a hollow hub, of a supporting tube extending through said post and non-rotatably fixed relative thereto, said tube having an enlarged supporting portion at the end contiguous to said wheel, said supporting portion being spaced from said wheel, and a speedometer mounted within the supporting portion of said tube and substantially flush with the hub, a speedometer drive means extending through said tube and operatively connected with said speedometer, and vehicle control levers positioned in the hollow portion of the hub outside of said supporting portion with their ends extending beyond the hub.

4. In a speedometer mounting for vehicles, the combination with a hollow steering post and a steering wheel rotatably mounted at the outer end thereof, said wheel having a hollow hub, of fuel and ignition control tubes, the one being rotatable within the other and the other rotatable within the steering post, a stationary supporting tube extending through said tubes and said post and non-rotatably fixed relative to said post, a supporting means mounted at the outer end of said supporting tube positioned within the hollow hub and spaced from the walls thereof, a speedometer supported within said supporting means, a speedometer drive means extending through said supporting tube and connected with said speedometer, and fuel and ignition control levers connected to said fuel and ignition control tubes and extending through and beyond the space between said hub and said supporting means.

In testimony whereof, I have hereunto set my hand at San Diego, California, this 30 day of August, 1926.

WILLIAM H. WHEELER.